US 8,655,733 B2

(12) United States Patent
Chen et al.

(10) Patent No.: US 8,655,733 B2
(45) Date of Patent: Feb. 18, 2014

(54) PAYMENT WORKFLOW EXTENSIBILITY FOR POINT-OF-SALE APPLICATIONS

(75) Inventors: Gang Chen, Sammamish, WA (US); Balaji Balasubramanian, Snoqualmie, WA (US); Dmitry V. Belikov, Redmond, WA (US); Himanshu Lal, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 12/548,435

(22) Filed: Aug. 27, 2009

(65) Prior Publication Data
US 2011/0055033 A1    Mar. 3, 2011

(51) Int. Cl.
*G06Q 20/00*    (2012.01)
(52) U.S. Cl.
USPC ................................. 705/17; 705/67
(58) Field of Classification Search
USPC .......................... 705/16, 35, 40, 36
See application file for complete search history.

(56) References Cited

U.S. PATENT DOCUMENTS

| | | | |
|---|---|---|---|
| 6,185,545 B1 | 2/2001 | Resnick et al. | |
| 6,547,132 B1 | 4/2003 | Templeton et al. | |
| 7,904,339 B2* | 3/2011 | Shah et al. | 705/16 |
| 2008/0046362 A1* | 2/2008 | Easterly | 705/40 |
| 2008/0086417 A1 | 4/2008 | Bykov et al. | |
| 2008/0195465 A1* | 8/2008 | Redmond et al. | 705/14 |
| 2009/0024471 A1 | 1/2009 | Nielson et al. | |
| 2009/0048935 A1 | 2/2009 | Blanc et al. | |

OTHER PUBLICATIONS

Hall, Jeyanthi, et al. "WPP: a secure payment protocol for supporting credit-and debit-card transactions over wireless networks." IEEE International Conference on Telecommunications (ICT). 2001.*

"ebusiness. Point of Sale", 2008, Interprise Software Systems International Inc., retrieved Jul. 29, 2009 at << http://www.interprisesuite.com/t-POS.aspx >>.

"SmartPaymentstm Client", Hypercom Corporation, retrieved Jul. 29, 2009 at << http://www.tpisoft.com/products/servicemanager/ >>.

"Multiple Integration Options to Support Just About any POS Platform", retrieved Jul. 29, 2009 at << http://www.abanco.com/index.php/ips/partner/integration >>.

"Payments Solutions", retrieved Jul. 29, 2009 at << http://www.provenco.com/RetailOil/Pdf/payments-solution-brochure.pdf >>.

(Continued)

*Primary Examiner* — Matthew Gart
*Assistant Examiner* — Rokib Masud
(74) *Attorney, Agent, or Firm* — Damon Rieth; Jim Ross; Micky Minhas

(57) ABSTRACT

Architecture that employs a software development kit and an add-in model to collect payment data and communicate with payment processors in a point-of-sale (POS) application to meet new requirements in new markets. Data gathered from an add-in and from the POS application can be combined and then communicated to the payment processor. The payment method can be determined and payment processing routed to different payment processors based on data and schema of data collected is also described. An add-in can also programmatically obtain information from the POS application information about a transaction and authorize a payment. A payment collecting/processing API is the interface between the POS application tender logic and payment collecting/processing logic and defines how a payment collecting/processing add-in interacts with the POS application.

20 Claims, 14 Drawing Sheets

(56) References Cited

OTHER PUBLICATIONS

"onePOS Payment Processing", retrieved Jul. 29, 2009 at <<http://www.onepos.com/downloads/onepos/brochures/oneposelectronicpayments.pdf>>.

Ingenico Inc., "Ingenico 6550 Customer-Activated Payment Terminal", Dec. 2008, accessed from <<http://www.retrevo.com/support/Ingenico-i6550-manual/id/21680bh226/t/2/>>.

* cited by examiner

PAYMENT WORKFLOW EXTENSIBILITY FOR POINT-OF-SALE APPLICATIONS

BACKGROUND

A point-of-sale (POS) application is typically used in retail stores to replace traditional cash registers. The POS application automates transaction processing from start to finish for various types of transactions such as sales, returns, work orders, layaways, and quotes. In addition, the POS application streamlines inventory management and reporting, makes it easy to track customer information, and maintains detailed customer history.

Payment data collecting and payment processing are core parts of retail sales transactions performed by a POS application. Within a POS application, the store owner can create a set of pre-defined payment methods and associate a set of supported hardware. Each payment method is pre-defined by payment format, an associated payment processor, and properties required by that payment processor. The payment format identifies a set of options applicable to a specific type of payment, such as payments toward customer accounts, cash payments, credit and debit card payments, check payments, vouchers payments, and others. For example, for a debit card payment format, the payment processor typically utilizes properties such as debit card number, expiration date, cash back limit, cash back fee, and a PIN. This is in contrast for a credit card payment format, where the payment processor usually utilizes properties such as, credit card number, expiration date, and credit card security code (e.g., CVV—card verification value), etc.

Each supported piece of payment hardware gathers partial or all required properties for certain payment methods. For example, a PIN pad is designed to gather an encrypted PIN data block from the customer with using a keypad. A magnetic stripe reader (MSR) obtains credit card account and expiration date from the magnetic stripe attached to a plastic card when the customer swipes the card through the device. An intelligent combination ("combo") device, which has its own onboard workflow, can function as both an MSR and a PIN pad at the same time.

At specified times when no hardware is utilized, a retail application can prompt the cashier to manually input payment data in lieu of getting the payment data automatically from hardware. Once all required payment data is gathered, the retail application communicates the payment data and amount desired to the payment processor, and then receives payment authorization.

Payment format and payment processor requirements vary greatly from jurisdiction to jurisdiction and can change over time. The POS product needs to have the necessary built-in support for collecting payment data and communicating the payment data to the payment processors in each jurisdiction where the product will be used. However, as the product expands and serves retail businesses in new markets, there is currently no way for the POS product to support new payment requirements in the new markets without requiring a new release of the POS application.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides extensibility in point-of-sale (POS) payment processing systems in support of changing conditions such as new hardware and software not originally considered in the product distribution. A software development kit (SDK) is included in the product distribution that facilitates the definition of one or more APIs (application programming interfaces) in the distribution and the creation of add-in modules in a POS application after distribution to meet new requirements in new markets by employing the add-ins for collecting payment data and communicating with a payment processor. The architecture also facilitates the ability to determine a payment method and route payment processing to different processors based on data and schema of the data collected, as well as for an add-in module to programmatically obtain from the POS application information about a transaction and then authorize payment.

The add-in modules are computer programs that support the collection of payment data from specific hardware and the proper formatting of the data according to payment processor requirements. The add-in modules can be developed by third-party developers for customized POS applications in markets not initially designed to support the out-of-box POS application. The disclosed add-in model provides longterm viability for the POS application after development and deployment since the add-in modules can thereafter provide the mechanism to support new payment formats, new hardware, and payment processors rather than updating the POS application itself.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
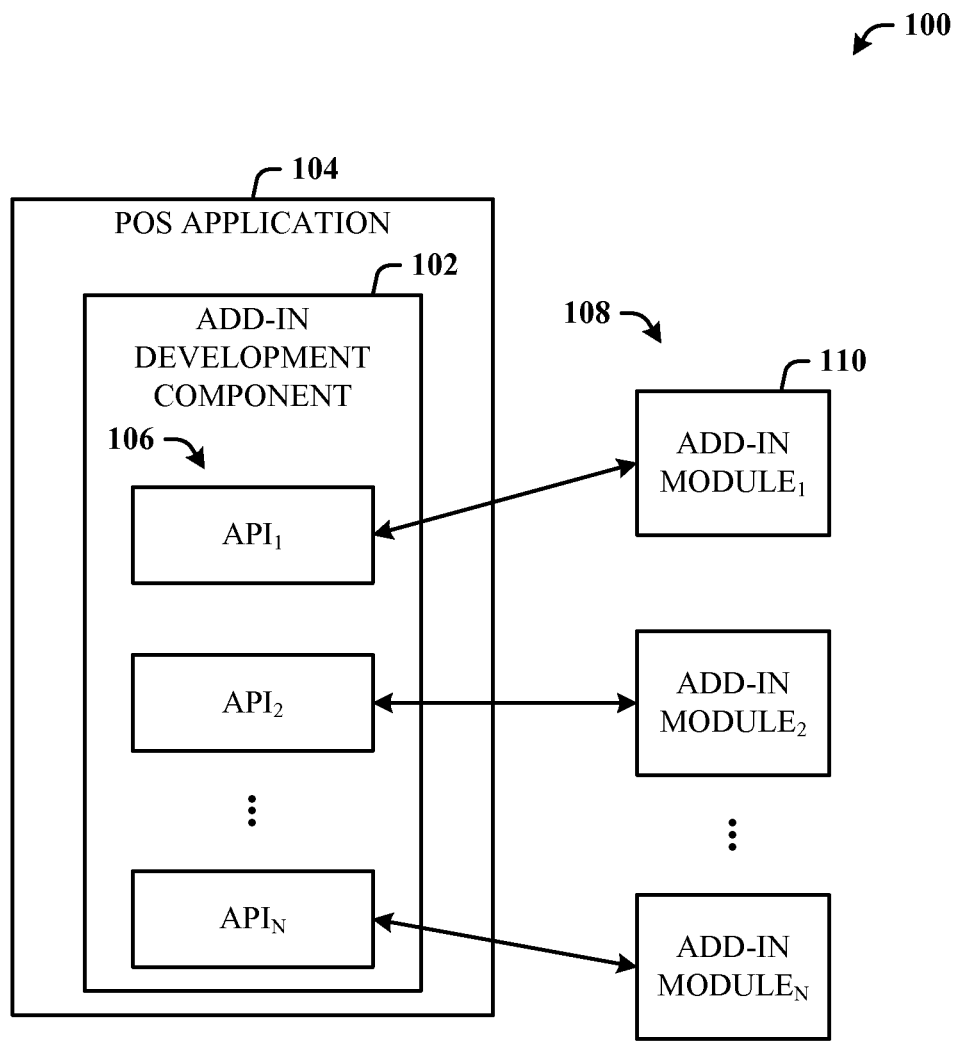
FIG. 1 illustrates computer-implemented point-of-sale system in accordance with the disclosed architecture.

The disclosed architecture describes methods that can be used during a transaction with or in a point-of-sale (POS) application through one or more add-in modules (also referred to herein as add-ins). An add-in is software (e.g., extension, plug-in, etc.) developed and implemented to interact with the POS application using an API (application programming interface). APIs can be developed utilizing a software development kit (SDK) that the disclosed architecture includes with the product distribution. An API can be developed and exposed via which the POS application can collect the desired payment data through a payment data collecting add-in, which can be a hardware or UI (user interface) add-in. Payment data are values for all the properties that define a payment format. A payment processor is an independent entity appointed by a merchant that verifies that the payment data that is collected by the merchant and relays the information back to the merchant about whether the process is successful or not. This verification process is sometimes referred as payment authorization (or settlement).

The POS application can communicate with different payment processor add-ins to obtain payment authorization, in addition to built-in functionality. The add-ins can be developed and deployed after the retail POS application is released. By doing so, payment collecting/processing functionality can be expanded as desired when the retail application is sold in new markets that have different payment requirements, as well as different hardware support and processing requirements.

The extensibility can be realized in a payment data collection phase and/or payment data authorization (or in-settlement) phase. Moreover, the different methods described herein allow extended payment data collection and/or authorization functionality to work with each other or with predefined/built-in payment data collection or authorization functionality in the POS application.

For example, a gift card scanner add-in and a gift card payment processor add-in can be developed and registered with the POS application using the aforementioned SDK APIs to support a gift card payment format. The payment format is a way to classify a payment into different categories, each of which has a definitive set of properties. For example, a credit card payment format can include properties such as credit card number, card holder name, expiration date, etc., while a check payment format can include properties such as check number, bank routing number, bank account number, etc. The gift card scanner add-in can be designed to communicate with a device that is connected with a computer via a hardware interface such as serial connector interface (e.g., USB-universal serial bus).

When a gift card in the form of a smartcard is inserted into the device, information such as account number, user name, and postal code, can be collected by the gift card scanner add-in and communicated to the POS application. The gift card payment processor add-in can be designed to communicate with a payment processor that issues the smartcard, maintains records of balance and transaction details, and provides a verification service.

When a transaction occurs with the POS application, and the customer elects to use the gift card as the payment method, payment data is collected and assembled with a transaction total and sent to the payment processor for authorization. The payment method is a way to define a relationship between the payment format and the payment processor. For example, a merchant can define a payment method called "Merchant Credit Card", which accepts payment data of a credit card payment format, and then communicates the payment data to a Merchant payment processor for verification. As used herein, the phrase "payment processor" is intended to mean a separate organization or entity that handles payment of a transaction. Accordingly, the Merchant payment processor is a separate organization that handles transaction payments for Merchant. Certain payment formats can be processed by more than one payment processor, such as credit card and debit card, while other payment formats can only be processed by a specific payment processor (e.g., a Merchant issued gift card).

Given that the POS application includes a generic set of interfaces to communicate with payment add-ins and a way to communicate errors to the end user, the POS application does not need to know the details about what payment data needs to be gathered for this particular payment processor and/or how to support the hardware for this particular payment format.

Another example is where information is gathered without the participation of any add-ins, and the information is then processed through one or more payment processor add-ins.

Yet another example of typical process of payment collection and processing is where the POS application gathers standard track information from supported hardware, such as a magnetic stripe reader (MSR), when a consumer swipes a credit card through the MSR. The POS application can then further display a UI dialog for the cashier to fill in the credit card security information (e.g., CVV—card verification value) obtained from the credit card. The POS application can then assemble the data gathered from both hardware and UI, and amount information from the current transaction into a predefined format for a payment processor and send the data to the payment processor backend to authorize the payment.

Still an example of a payment format specific to certain jurisdiction is a gift card that embeds data in a smartcard chip, which can only be scanned by a corresponding smartcard reader. The data on the card includes customer information, account number, etc., and can only be processed by a payment processor that provides service in that market. For this scenario, which may not apply to other geographic markets, it may not be desirable for the POS application to provide functionality that supports certain hardware and/or payment formats.

Generally, the disclosed architecture provides the ability to employ an SDK and an add-in model to collect payment data and communicate with payment processors in the POS application to meet new requirements in new markets. Additionally, the architecture provides the ability to combine data gathered from an add-in and from the POS application, and then communicate with the payment processor. For example, an intelligent combination ("combo") device can be utilized that provides multiple different input mechanisms (e.g., MSR, PIN pad, etc.) for receiving user information in different formats such as account information, access code, confirmation input for a transaction, etc. These intelligent combo devices are typically facing the customer ("customer-facing input device") so that the customer can swipe a card, input a code, and/or provide a signature. These multi-function devices are referred to herein as hydra devices. The hydra device then communicates this customer input information in the different formats or a single format to the POS application. Since the hydra device employs multiple functionalities, the device interface to the POS application can employ more than one service object. The ability to determine the payment method and route payment processing to different payment processors based on data and schema of data collected is also described.

An add-in can also programmatically obtain transaction information from the POS application and authorize a payment. The payment processing API is the interface between the POS application tender logic and payment processing logic. The payment processing API defines how a payment processing add-in interacts with the POS application. The payment data collecting API is the interface between payment data collecting logic and the POS application tender logic. The payment data collecting API defines how a payment data collecting add-in interacts with the POS application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented point-of-sale system 100 in accordance with the disclosed architecture. The system 100 includes an add-in development component 102 (similar to the SDK) of a POS application 104 for implementing one or more interfaces 106 (denoted APIs$_{1-N}$) for add-in modules 108 to process a transaction. The add-in development component facilitates the creation of the add-in modules 108 and interfaces 106 for expanding (extending) the capabilities of the POS application 104. The system 100 can also include an add-in module 110 that communicates with the POS application 104 via an interface to process payment data as part of the transaction.

The add-in module 110 can be a payment collection module that collects the payment data from POS components (e.g., POS hardware, POS input software, etc.) and/or via a UI. Alternatively, the add-in module 110 can be a payment authorization module that processes authorization of the payment data as part of the transaction. The add-in modules 108 can include the payment collection module and the payment authorization module, as well as other add-ins for supporting existing and new market requirements.

The POS application 104 generates POS data related to the transaction and the add-in module 110 can also generate add-in data related to the transaction. The POS data and the add-in data can be combined, formatted, and transmitted to a payment processor. The add-in module 110 can obtain transaction information (e.g., account, amount, etc.) from the POS application 104 and authorize payment based on the obtained transaction information.

The POS application 104 routes payment data to a specific payment processor based on add-in data of the add-in module 110 and a defined schema of the add-in data. The add-in module 110 registers with the POS application as a hardware add-in. The POS application 104 can execute the add-in module 110 based on a format of the payment data. Additionally, the add-in module 110 can communicate a portion of the transaction data of the transaction to a payment processor. These and other novel aspects are described in detail herein.

Figure 2:
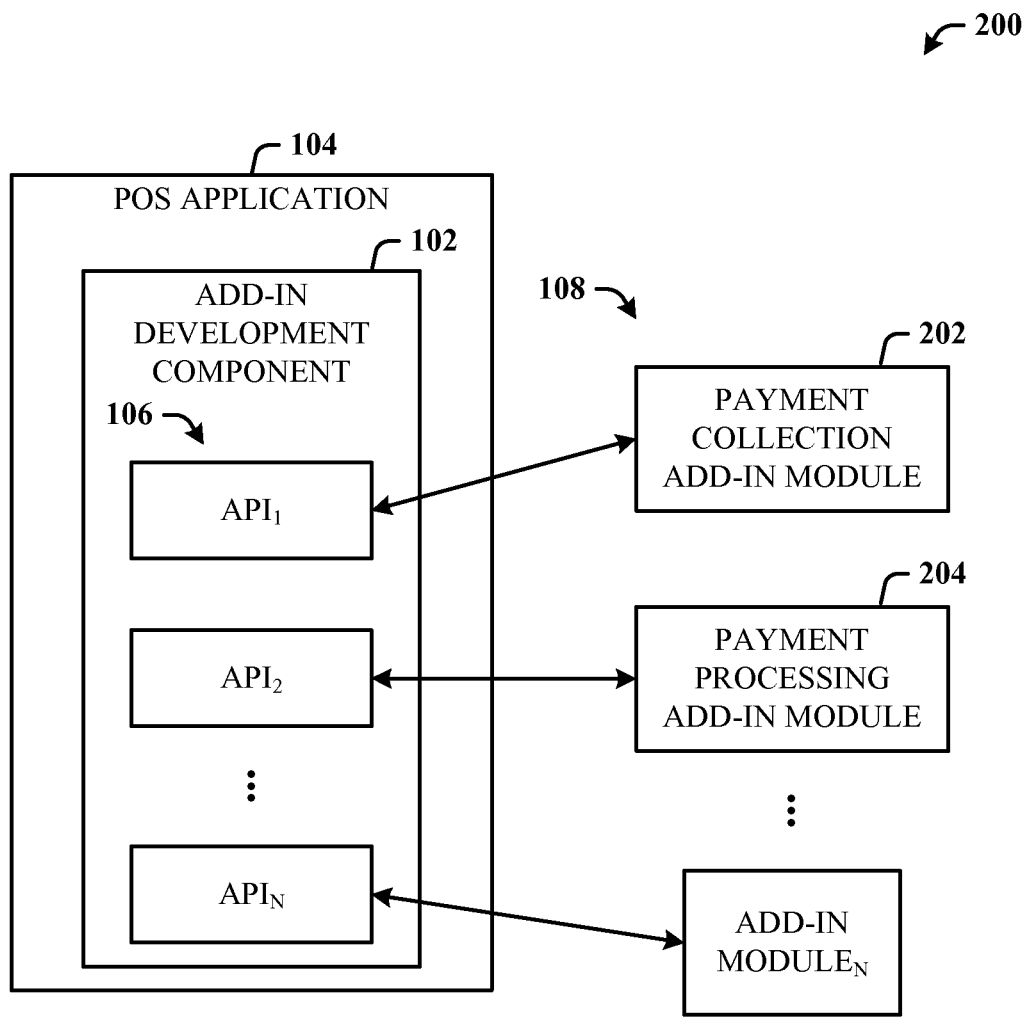
FIG. 2 illustrates an alternative embodiment of a POS system that exposes interfaces for the utilization of add-ins in transaction processing.

FIG. 2 illustrates an alternative embodiment of a POS system 200 that exposes interfaces 106 for the utilization of add-ins in transaction processing. The system 200 includes the add-in development component 102 of the POS application 104 that exposes one or more of the interfaces 106 for add-in modules 108 to process a transaction. The system 200 also includes a payment collection add-in module 202 that interfaces to the POS application 104 via an add-in development component interface to collect payment data as part of the transaction, and a payment processing add-in module 204 that interacts with the POS application 104 via an add-in development component interface to process authorization of the payment data as part of the transaction.

The POS application 104 generates POS data and the payment collection add-in module 202 generates add-in data. The POS data and the add-in data can be combined and transmitted to a payment processor by the POS application 104. The POS application 104 can route the payment data to a specific payment processor based on the add-in data and the schema of the add-in data. The POS application 104 executes the payment processing add-in module 204 based on the format of the payment data. The POS application 104 can also format the payment data according to a predefined payment data schema in response to selection of a payment method by a user.

Figure 3:
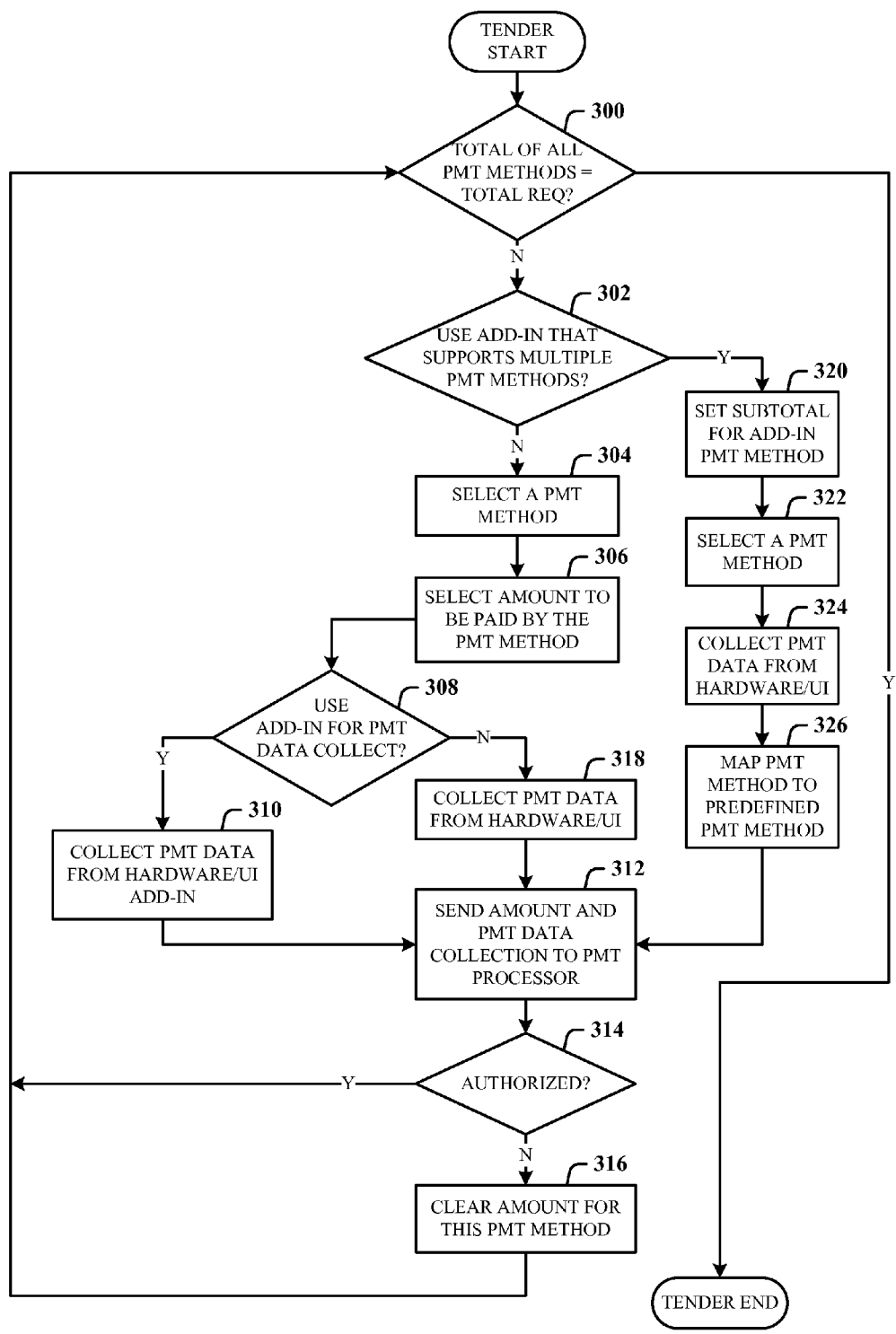
FIG. 3 illustrates an exemplary payment flow that includes a hydra device hardware add-in and a hardware/UI add-in for collecting payment data.

FIG. 3 illustrates an exemplary payment flow that includes an intelligent combination hardware add-in and a hardware/UI add-in for collecting payment data. In a standard payment workflow, it is common for most POS applications to have a certain level of functionality that enables the POS application to collection payment data from popular hardware or built-in user interface, and then communicate with one or more payment processors to get the payment authorized. Some of the common hardware includes the MSR, PIN pad, barcode scanner, etc.

In the POS application, a typical workflow that involves payment data collecting and processing is referred to as tender. In a transaction, tender occurs after all items a customer is about to purchase are added to the purchase list, and the total amount is then calculated. Once the total is calculated, the customer is able to select one or more payment methods available to make payment of the total. After the payment method and the amount to be paid by the payment method is set, the POS application then gathers the payment data for each payment method and verifies if the payment is valid. For cash payments, this can involve checking the authenticity of the bill. For a credit card payment method, this can involve gathering payment data from the UI/hardware, and validating that the card holder has a sufficient account balance to pay the amount elected with a payment processor. Once all payment methods elected are verified, the tender completes successfully, and the transaction is posted.

The disclosed payment data collection portion of the transaction is extended through module add-ins. With a defined set of APIs now exposed by the POS application in accordance with the disclosed architecture, the POS application can host other computer programs which interact to provide the desired functions "on demand". For example, payment data can be collected by using an add-in, rather than the POS application itself.

A payment collecting add-in module can register with the POS application at setup. When needed, or during POS application startup, the add-in module can then be loaded. When a specific payment format indicates that payment data is to be collected by the payment add-in module, the add-in module is executed by POS application. The add-in module then communicates back to POS application with the information collected (the payment data of the specific payment format).

Alternatively, the payment collecting add-in module can also register with POS application as a hardware add-in. When the POS application starts and hardware attached to computer is scanned, the add-in module can be loaded and queried if the specific payment hardware is available. If so, and a specific payment format is indicated such that this particular hardware is used to gather the payment data, the add-in module is executed by POS application, and the data is collected and communicated to the POS application.

The hydra device is utilized in retail operations where the customer manually interacts to input personal information such as account and PIN, for example, and includes its own workflow. For example, the device stores its own workflow to allow the customer to select among several payment methods and, then make payment and provide a signature according to the selected method. In other words, the hydra device can integrate MSR, PIN pad, and signature functionality into one device, operate a program that guides a customer through a workflow, and allows the device to work with POS application.

The disclosed architecture facilitates integration of the hydra device or other similar devices into POS application through one or more add-in modules. Once the add-in module registers with the POS application, the module is queried at POS application startup to check if the hydra device is attached. If attached, at tender, a UI is presented to direct partial or full amount of total cost to the device. Using an API, the POS application can then communicate with the add-in module and send the amount to be charged to the device.

The device then presents and allows the customer to select a payment format to use (e.g., debit card, credit card, etc.), and gather payment data (e.g., card tracking information) using the built-in MSR or encrypted PIN block utilized with a built-in PIN pad. Once the payment data is gathered, the add-in module communicates back to the POS application. The POS application uses the payment data to determine what payment method to use and verifies with a payment processor that the payment method is approved. Once verified, the POS application notifies the add-in module of the result and collects the customer signature, if needed.

The disclosed architecture also provides a payment data schema. The payment data schema is a data schema that defines how the payment data is assembled and communicated between different parts of the POS application, such as payment collecting logic, POS tender logic, and payment processing logic. For example, an XML (extensible markup language) schema can include all the properties of the payment data as its elements, or a data class that includes all the properties of payment data as its members.

With one or more of the APIs and the payment data schema definition, an add-in module can communicate back which payment format the customer selected, and which payment method is to be used with that payment format. For example, an interface can be exposed that allows add-in module to query payment methods the POS application has setup, and allows an add-in to define the mapping between payment methods and payment format the POS application supports. The payment data schema defined can also detail which element to be used to communicate the customer selection for the payment method back to the POS application. An element of the payment data schema can also indicate how to interpret the payment data collected so that the POS application can understand and reformat data, if desired, to get the payment data verified with the payment processor.

In addition to a more complex device that includes its own workflow, an API can also be provided that supports extension of the payment data collection for simple devices or manual inputs. For example, the POS application usually has built-in support for reading track-1 and track-2 data from a credit card. An add-in module can be designed to read the additional information stored in track-3. Once this add-in module is registered with the POS application to be used with a credit card payment format, all payment methods that have a credit card payment format can use this new add-in module to collect payment data, which includes information of the third track. An add-in module can be designed to directly communicate with the hardware and get track information. Alternatively, the add-in module can be a UI add-in and request manual input for the data of track-3.

The POS application can also combine data from multiple sources to meet the requirements of a payment processor. For example, a hardware add-in can gather track information about a credit card, the POS application gathers the card security information from the UI, combines both information, and then sends the information to the credit card payment processor that uses the card security information for verification.

Another extension of a payment data collecting add-in module is to gather preset payment data with a token or password from a "virtual wallet". For example, a secure website can offer a web service to store payment data, such as a credit card number and track information details, which can be retrieved by a user ID and password pair. An add-in module can be developed by the website or third party to prompt the customer to enter the user ID and password on a secondary display, or self checkout kiosk, retrieve the payment data from the web service, and then communicate back to the POS application that hosts the add-in.

The workflow extended to include complex hardware add-ins and hardware/UI add-ins for payment data collecting is illustrated in FIG. 3. More specifically, tender starts, and at 300, a calculation is made to determine if the total of all payment (PMT) methods equals the total requested. If not, at 302, another computation is made to determine if an add-in is to be used that supports multiple payment methods. If not, flow is to 304, the customer selects a payment method. At 306, the amount to be paid by the payment method is selected. At 308, a computation is made to determine if to use an add-in for payment collection. If so, flow is to 310 employ a hardware/UI add-in to collect the payment data. Flow is then to 312 to send the amount and payment data to a payment processor. At 314, a computation is made to determine if the payment is authorized. If authorized, flow is back to 300 to process the next transaction. If payment is not authorized by the payment processor, flow is from 314 to 316 where the amount for this method is cleared. Flow is then back to 300 to process the next transaction.

At 308, if an add-in module is not to be used for payment data collection, flow is to 318 to collect the payment data via the hardware/UI. Flow is then to 312 to send the amount and payment data to a payment processor. Going back to 302, the computation is made to determine if an add-in is to be used that supports multiple payment methods. If yes, flow is to 320 to set the subtotal for the add-in payment method. At 322, the payment method is selected. At 324, payment data is collected from the hardware/UI. At 326, the selected payment method is mapped to a predefined payment method. Flow is then to 312 to send the amount and payment data to a payment processor. Flow then follows the previously described steps.

At 300, the computation is made to determine if the total of all payment methods equals the total requested. If yes, the tender process can then end.

Figure 4:
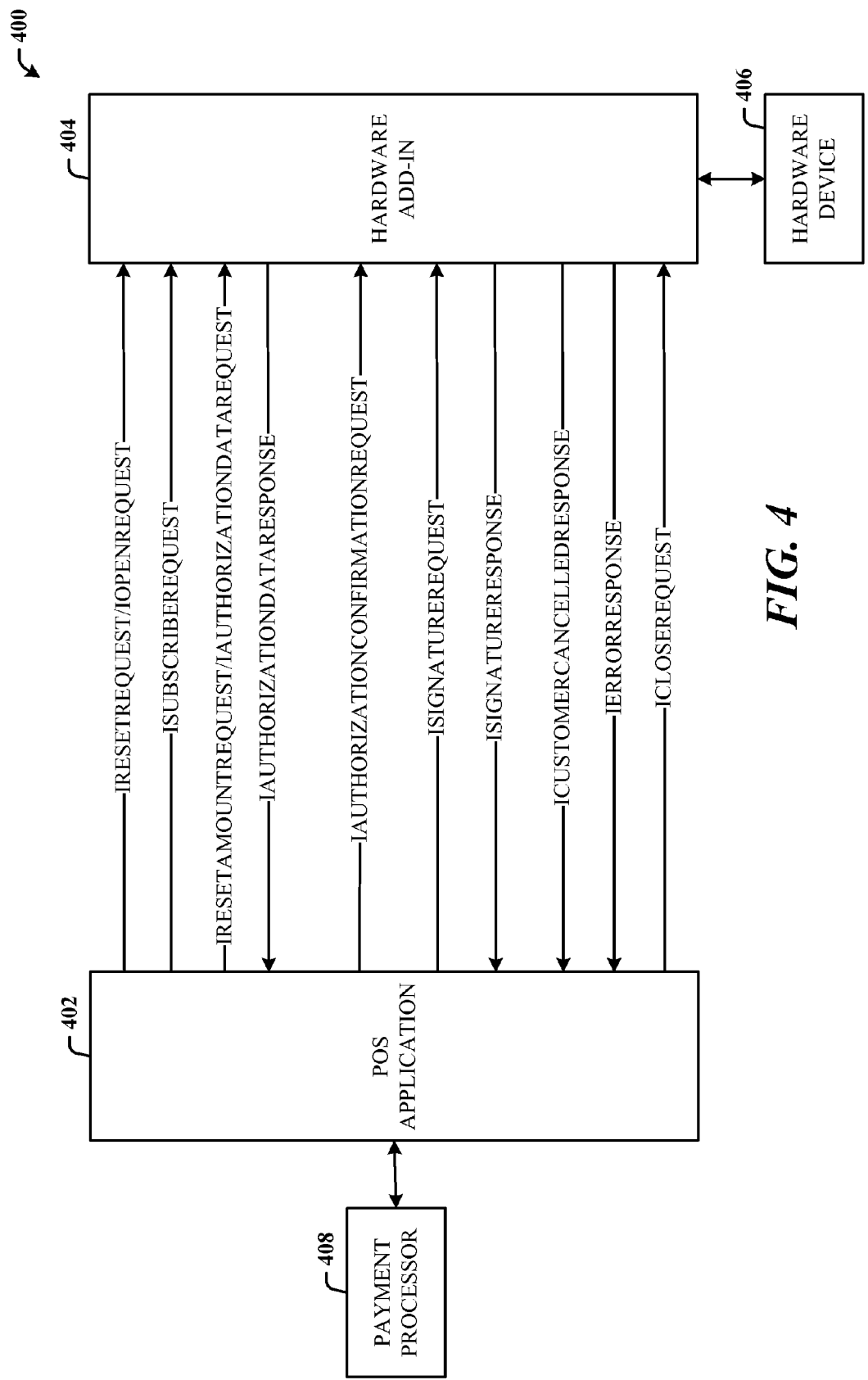
FIG. 4 illustrates an exemplary API between a POS application and a hardware add-in module for a POS hardware device.

FIG. 4 illustrates an exemplary API 400 between a POS application 402 (similar to POS application 104) and a hardware add-in module 404 for a POS hardware device 406. Payment data collection can be extended through add-ins that support multifunctional devices and simple devices. The communications is defined by a set of requests and responses, which can be represented as objects for easy queuing and dispatching. Alternatively, requests and responses can be defined as methods of an interface. When the POS application 402 starts, the POS application 402 queries all registered add-ins (e.g., hardware add-in module 404) and confirms whether the supported devices are currently attached. If so, the POS application 402 sends an initialization request (e.g., IOpenRequest) to initialize the device 406. Once initialized, the POS application 402 sends a subscribe request (e.g., ISubscribeRequest) to the add-in module 404 to listen to add-in activities. Thereafter, the device 406 enters a ready mode until further requests are received from the POS application 402.

When a transaction total is calculated and the user elects to send the amount to the device 406, the POS application 402 sends an amount request (e.g., ISetAmountRequest) with the specific amount to the device 406. Once the device 406 receives the request, the device 406 continues with its workflow and collects payment data. The workflow on the device 406 can involve the customer swiping a card, selecting the payment format, selecting a cash back amount, etc. Once the payment data is collected, the add-in module 404 sends an authorization response (e.g., IAuthorizationDataResponse) to the POS application 402. The POS application 402 gets the payment data from the authorization response and sends the payment data to a payment processor 408.

Once the payment processor 408 verifies the payment data, the POS application 402 relays the response back to the add-in module 404 via an authorization confirmation request (e.g., IAuthorizationConfirmationRequest). Depending on the result, the device workflow terminates or waits for a further request of the customer signature. If the POS application 402 determines that the payment format needs a signature, the POS application 402 sends a signature request (e.g., ISignatureRequest). Upon receiving the request, the add-in module 404 then collects the signature data and sends the signature data back to the POS application 402 via a response (e.g., ISignatureResponse).

The transaction is then posted, and a reset request (e.g., IResetRequest) is sent to the device 406 to re-initialize the device 406 for the next transaction. When the POS application 402 shuts down, the POS application sends a close request (e.g., ICloseRequest) to the device 406 to shut down the device 406.

Figure 5:
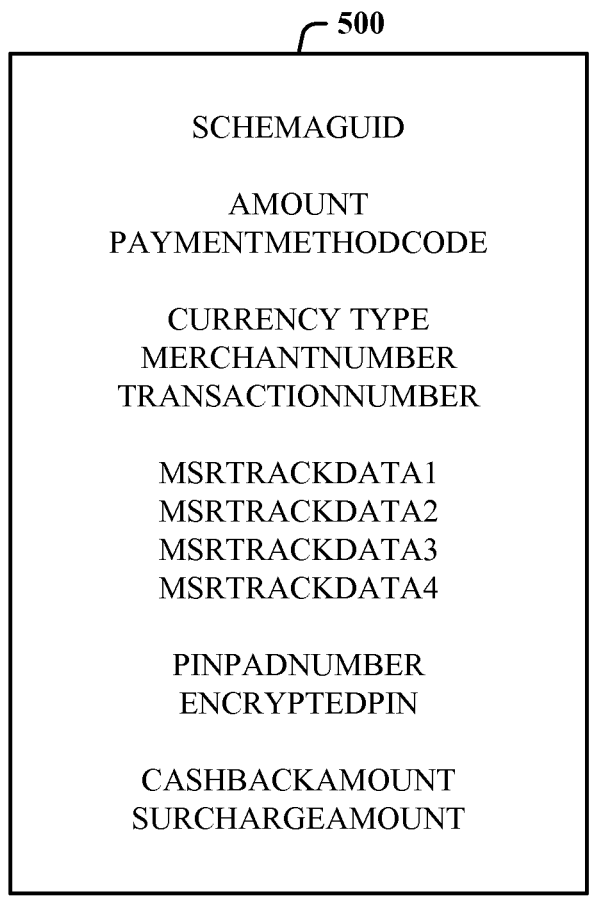
FIG. 5 illustrates an exemplary data schema for collecting payment data from a hydra device.

FIG. 5 illustrates an exemplary schema 500 for collecting payment data from a hydra device. As previously described, the hydra device is a multi-function device that can operate as an MSR, a PIN pad, and a signature pad, for example, as well as other functionality. Using the predefined schema 500, the POS application can interpret the payment data gathered from the device, reformat the data, and combine the data collected from device with additional data collected from POS application, if necessary, before communicating with the payment processor.

The schema 500 is defined to include the following elements: SchemaGUID, which uniquely identifies that this schema is designed for a specific customer input device. An Amount element is the total that the customer elects to pay. A PaymentMethodCode element defines the payment method to use for this specific transaction. For example, the customer chooses the payment format on the device workflow. The add-in then maps the payment format to the specific POS payment method before sending the payment data to the POS application. Other elements can be provided, such as for track data (e.g., MSRTrackData), type of currency (e.g., CurrencyType), merchant number (e.g., MerchantNumber), transaction number (e.g., TransactionNumber), PIN pad number (e.g., PINPadNumber), cash back amount (e.g., CashBackAmount), any surcharge amount (e.g., SurchargeAmount), and encrypted PIN data (e.g., EncryptedPIN).

One way to send payment data from the add-in to the POS application is to define a data structure, such as a class, that holds certain data members. Another way is to define an XML schema and serialize the payment data into an XML data block. Once received, the POS application de-serializes the XML block and uses the data, as necessary.

The disclosed extensible architecture allows an add-in developer to define a custom payment data schema as long as the custom schema can be uniquely identified and there is mutual understanding of the schema between the payment data collection add-in and the payment processing add-in.

Following is a description of schema driven payment processor selection in a POS application. As previously described, payment data can be collected in different ways. The POS application is typically released with certain built-in support for commonly used hardware that can gather the payment data, such as the MSR for track data and PIN pad for encrypted pin block. Additionally, the POS application typically offers a UI that allows a user to gather payment data manually, as an alternative. This kind of UI can be a form that allows user to enter a credit card number and/or CVV, for example.

By utilizing the disclosed add-in architecture in the POS application, the POS application can host different types of add-ins to gather payment data, such as a hydra device add-in that has its own workflow and allows payment data gathering for different payment methods, or a simple hardware/UI add-in that does not include its own workflow. Note also that payment data can be collected via different techniques. The techniques can be combined to complement each other and meet payment processor requirements.

The POS application can also be distributed with built-in support for commonly used payment processors. In order to meet the need of new markets and new payment format requirements, the disclosed add-in API architecture can be defined so that the POS application can host add-ins to communicate with new payment processors that support new payment formats.

Following are example scenarios as to how a POS application can be designed to extend payment workflow with a payment data collection add-in and payment processing add-in.

In a first typical POS application with built-in hardware support, the POS application can gather credit card payment information, and using a standard UI, the POS application can collect the security code of the credit card by manual input from users. The POS application then sends the complete payment data to the payment processor associated with the payment method selected by the user.

In a second example scenario, a hardware add-in can be developed and registered with the POS application to read data from a formatted card (or generally, an input medium). Once the card data is gathered, a UI add-in or built-in UI from the POS application can further gather additional information for this payment format. The POS application then sends the complete payment data to the payment processor.

In a third example scenario, a hardware add-in can be developed to support the hydra device (e.g., customer-facing input device) and its device workflow. Using a predefined payment data schema, the POS application can communicate with the add-in to obtain the payment data and the payment method that map to the payment format selected by the user. The POS application can further interpret data, combine with payment data from other payment data collecting sources, format the payment data properly, and then send to the payment processor having a payment method indicated by data in the predefined schema.

In a fourth example scenario, a hardware add-in can be developed to support a newly emerging device on the market. In this example, there is no predefined payment data schema offered by the POS add-in architecture that describes all the payment data for certain payment format that can be gathered by this new device. However, the POS add-in architecture defines certain required elements for a payment data schema so that the POS application can differentiate predefined schema offered by POS add-in architecture from extended schema offered by a third party. For example, the POS application in this example can require that all third party schema has at least two elements, a SchemaGUID that uniquely identifies a payment data schema (regardless if defined by POS add-in architecture or third party), a PaymentMethod that identifies the payment method to be used for payment data formatted with this schema and an amount that indicates the total amount to be verified for this payment method.

A payment data schema, uniquely identified by a value for SchemaGUID, is co-defined and published by the hardware add-in developer and a payment processor. The payment processor or developer can offer a payment processor add-in that can understand the data collected by the hardware add-in and communicate the data to the payment processor for verification.

Once both add-ins register with the POS application, a new payment method is configured for the payment format described by the new device, and the payment processor add-in is employed. In addition, the hardware add-in will be setup so that when communicating with the POS application, the co-defined value is used for the SchemaGUID, and the payment method that uses the payment processor add-in is used for the PaymentMethod.

The POS application then loads the hardware add-in to gather payment data for the new device. The POS application then attempts to interpret the payment data gathered with the SchemaGUID that is a baseline for all payment data schema. Given that the payment data SchemaGUID does not match any predefined payment data schema, the POS application then passes the entire payment data to the designated payment method set by the PaymentMethod. Given that the payment method is configured to use the payment processing add-in that understands the payment data schema, the add-in then interprets the payment data and communicates with the payment processor for verification.

Note that it can be the case where the payment processing add-in determines that the payment data is incomplete. In this situation, the add-in can prompt user with for further input via the add-in UI.

In accordance with the disclosed architecture, a payment processing add-in can be developed for a specific payment format such as a customer account. In this example, however, there is no particular hardware requirement. Once this add-in is registered with the POS application, a new payment method can be configured for this payment format, which utilizes the add-in for verification.

During tender, the user can elect to use this payment method for payment. When selected, the POS application formats basic payment data using the predefined payment data schema, which in this example only includes two required elements (a SchemaGUID defined by the POS SDK and an Amount), and send the basic payment data to the payment processing add-in. Using the predefined SchemaGUID, the payment processing add-in recognizes that more payment data needs to be gathered. The add-in then prompts the user to input information that the payment processor requires, such as customer name, address, ID, etc. Alternatively, using an exposed SDK API, the add-in can query the customer data for the current transaction and construct the payment data without prompting the user for manual input.

Figure 6:
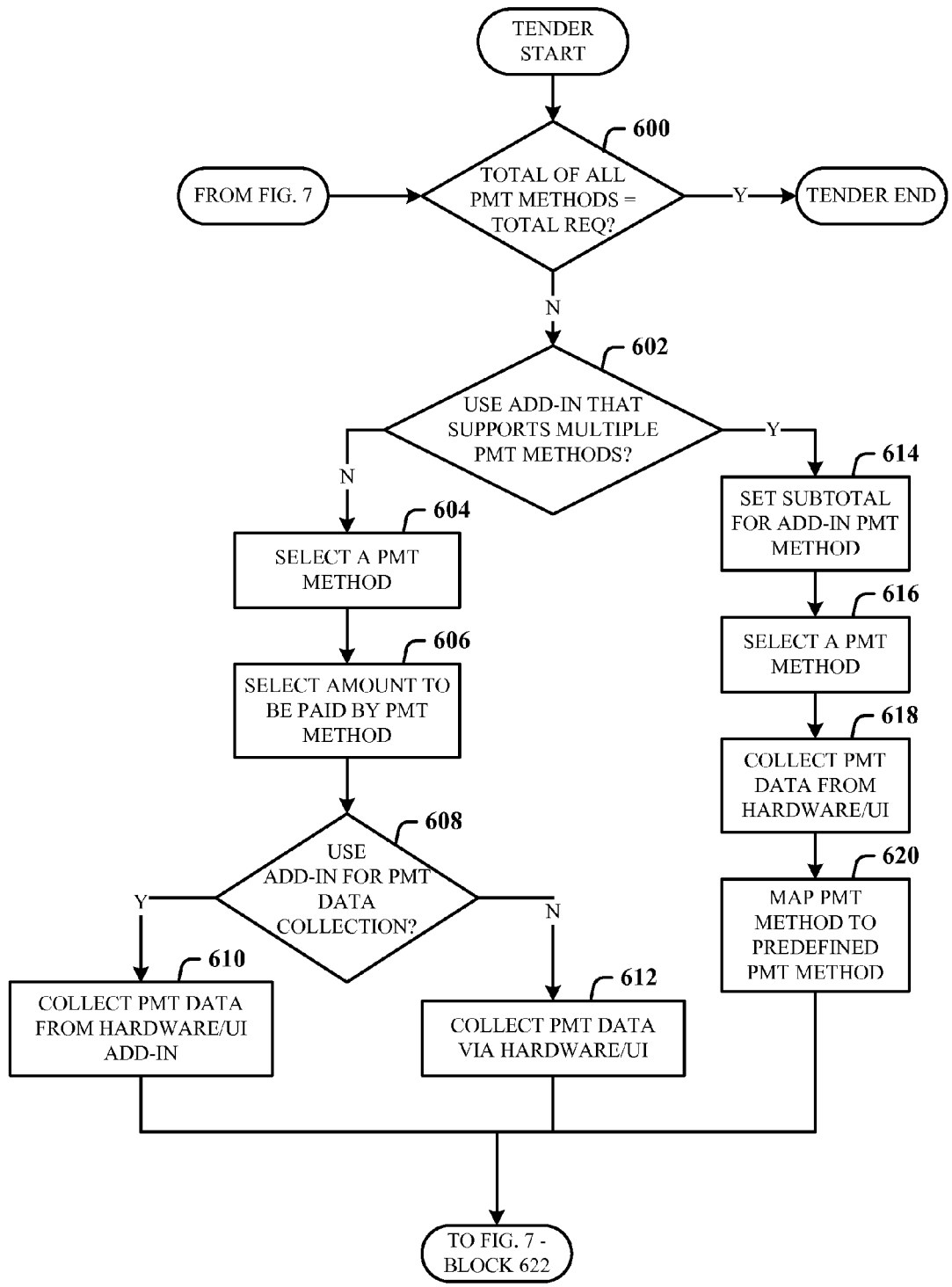
FIG. 6 and FIG. 7 illustrate a flowchart that represents a method of extending payment processing via an add-in module.
Figure 7:
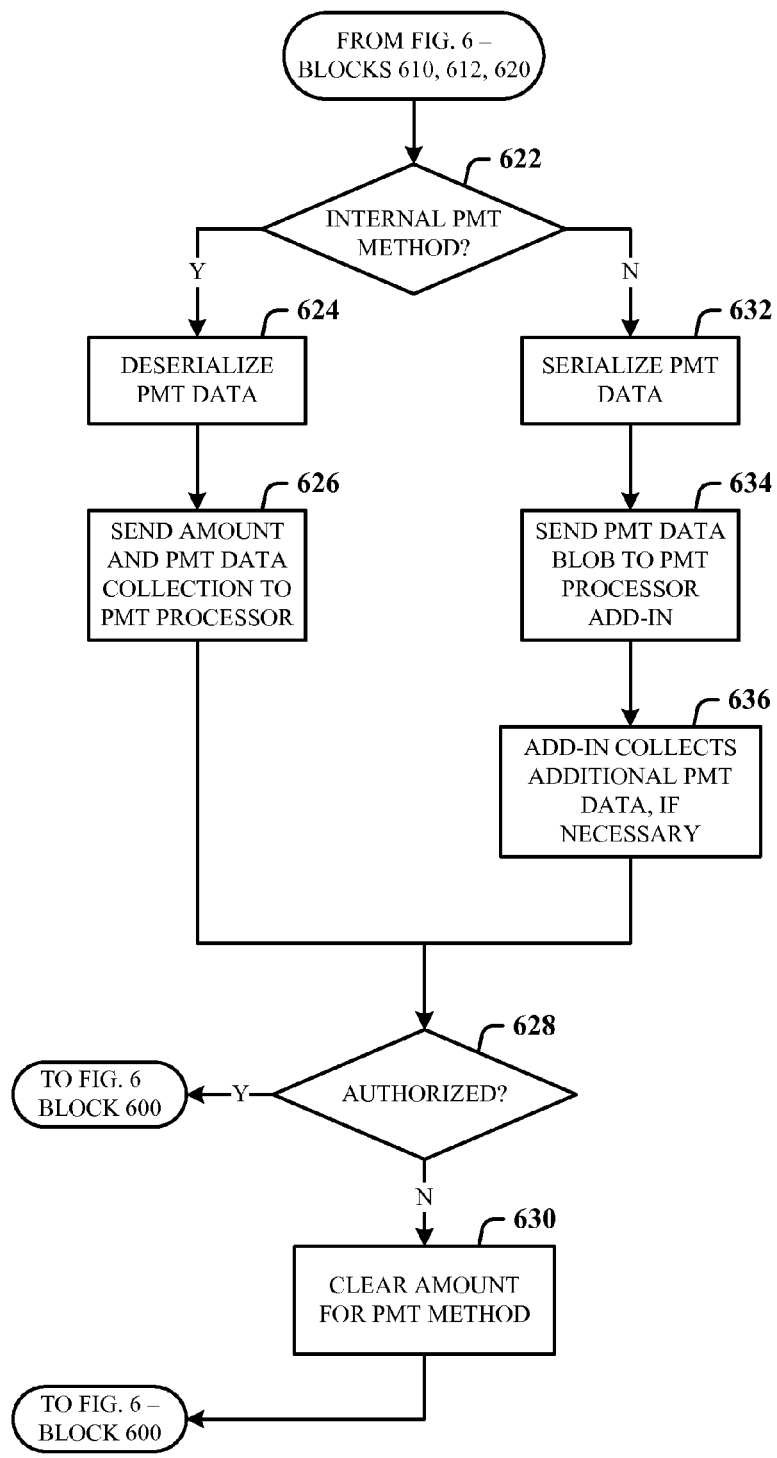

FIG. 6 and FIG. 7 illustrate a flowchart that represents a method of extending payment processing via an add-in module. The tender starts, and at 600, a computation is made to determine if the total of all payment methods equals the total requested. If not, at 602, another computation is made to determine if an add-in is to be used that supports multiple payment methods. If not, flow is to 604, the customer selects a payment method. At 606, the amount to be paid by the payment method is selected. At 608, a computation is made to determine if to use an add-in for payment collection. If so, flow is to 610 employ a hardware/UI add-in to collect the payment data. If not, flow is from 608 to 612 to collect the payment data using the hardware/UI.

Going back to 602, the computation is made to determine if an add-in is to be used that supports multiple payment methods. If not, flow is to 614 to set the subtotal for the add-in payment method. At 616, the payment method is selected. At 618, payment data is collected from the hardware/UI. At 620, the selected payment method is mapped to a predefined payment method.

Flow from 610, 612, and 622 is then to FIG. 7, block 622, to determine if to use an internal payment method. If yes, flow is to 624 to deserialize the payment data. At 626, the payment amount and payment data collected is sent to the payment processor. At 628, a computation is made for authorization by the payment processor. If authorized, flow is to block 600 of FIG. 6. If not authorized, flow is from 628 to 630 to clear the amount for the payment method. Flow is then to block 600 of FIG. 6.

If not selecting an internal payment method, at 622, flow is to 632 to serialize the payment data. At 634, the payment data blob is sent to the payment processor add-in. At 636, the add-in collects additional payment information, if necessary. Flow is then to 628 or the authorization process, as previously described.

Figure 8:
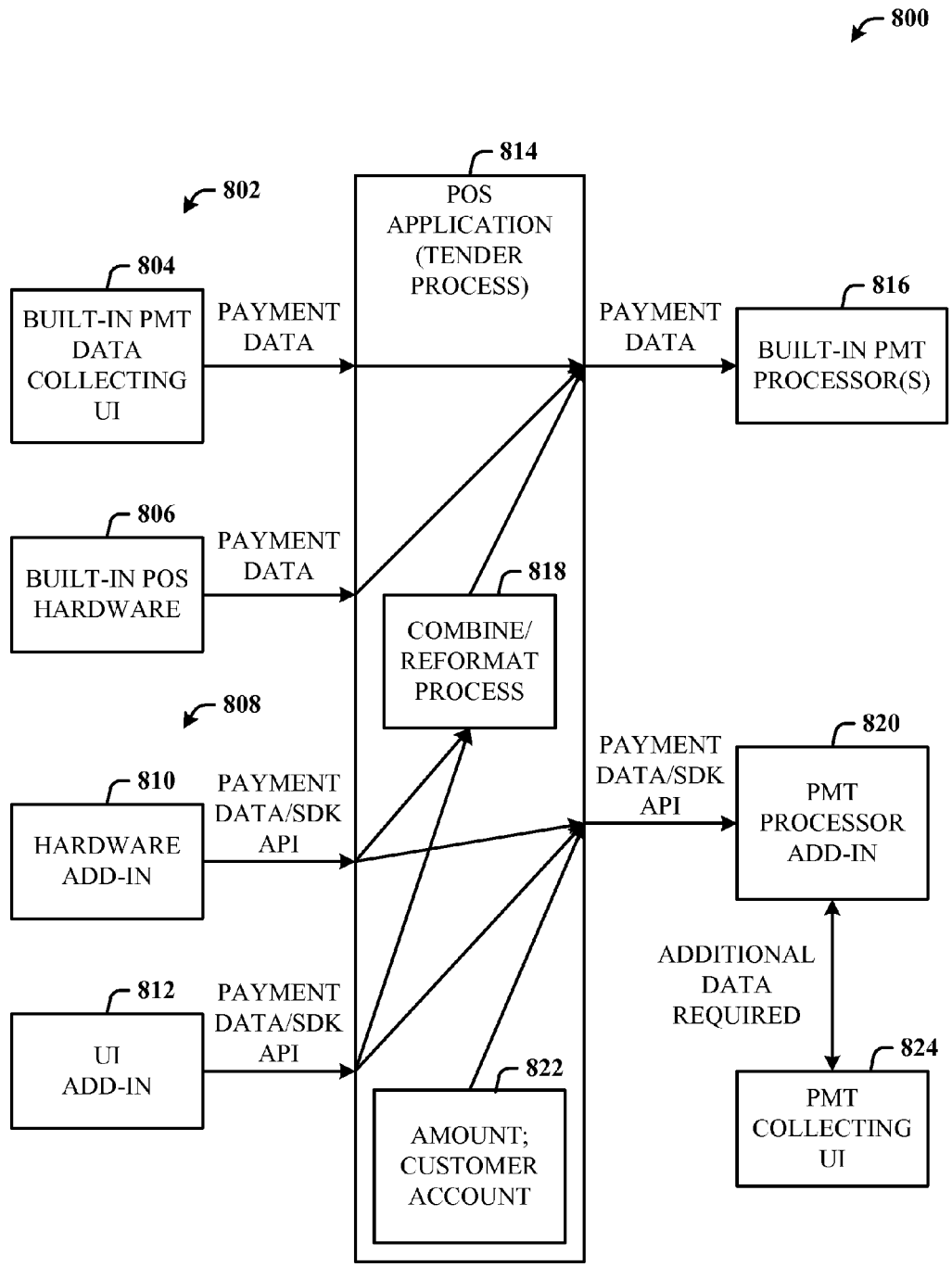
FIG. 8 illustrates general data flow for data collection and processing using one or more add-ins in accordance with the disclosed architecture.

FIG. 8 illustrates the general data flow 800 for data collection and processing using one or more add-ins in accordance with the disclosed architecture. Generally, the data flow 800 includes built-in components 802, which include a built-in UI 804 for collecting payment data, and built-in POS hardware 806, and add-in components 808, which can include a hardware add-in 810, and UI add-in 812. One or more of built-in components and the add-ins components 808 can be employed to collect payment data. The payment data for the built-in components 802 can be sent to a POS application 814 using packaged formats, and then forwarded to built-in payment processor(s) 816. The add-in components 808 can send the payment data to the POS application 814 via an API.

The payment data can be combined and/or reformatted via an associated process 818 for routing and processing by the built-in payment processor(s) 816. Alternatively, the payment data received from one or more of the add-in components 808 can be sent directly (without combining and/or reformatting) to a payment processor add-in 820 (via an add-in API). Where the payment data from one of the add-in components 808 is incomplete or not present, payment information such as amount and/or customer account 822 can be obtained from the POS application 814. Additionally, where the payment data passed to the payment processor add-in 820 is incomplete, additional payment information can be obtained via a payment collection UI 824.

Figure 9:
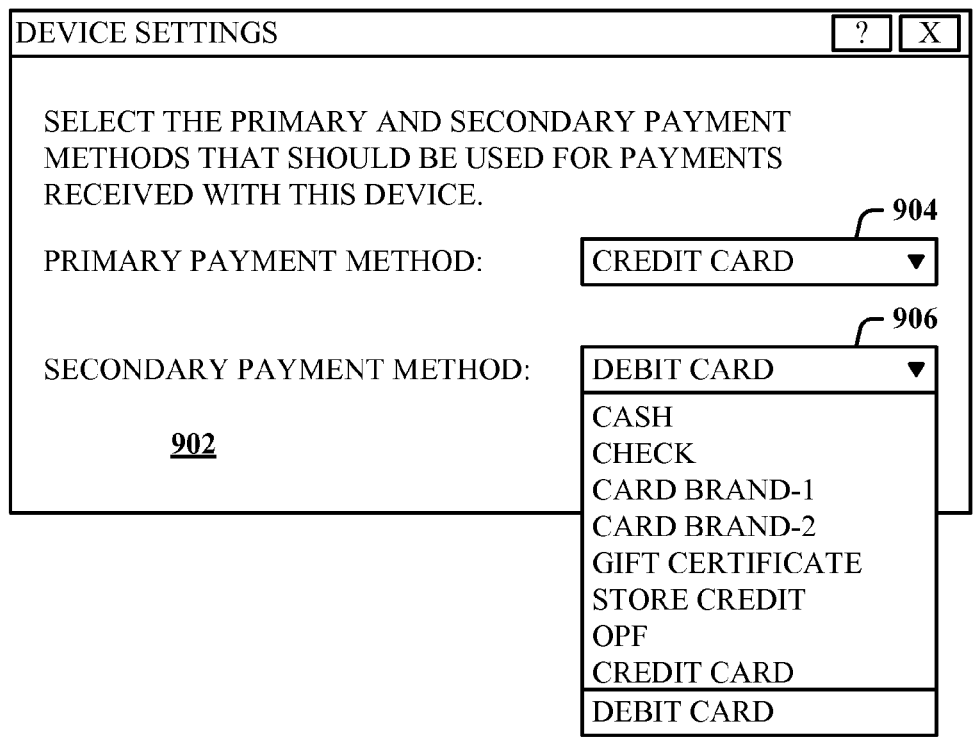
FIG. 9 illustrates a hardware add-in UI for a customer-facing device.

FIG. 9 illustrates a hardware add-in UI 900 for a customer-facing device. The UI 900 facilitates the mapping of a payment method to the customer-facing device. The UI 900 can include a dialogue panel 902 that presents options to select payment methods for the associated hardware add-in. Here, the hardware add-in supports two payment methods: a primary payment method and a secondary payment method. The primary payment method is selected from a dropdown menu 904 to be credit card, and the secondary payment method is selected from a dropdown menu 906 to be debit card.

To the credit card payment processor the payment method appears to be defined by the POS application. Similarly, to the debit card payment processor the payment method appears to be defined by the POS application. The POS application knows how to redirect the payment data collected. Moreover, based on the schema, the POS application determines that the payment is for a credit card or a debit card and sends the payment data to the mapped payment processor. In addition to credit card and debit card, other selectable payment options can include cash, check, card brand-1, card brand-2, gift certificate, store credit, open payment framework (OPF).

Following is sample payment data formatted as an XML data block according to a schema defined by the SDK, for example, the schema defined in FIG. 5.

```
<?xml version=\ "1.0\" encoding=\"utf-16\"?>
<AuthorizationDataStructure
    xmlns:xsi=\"http://www.w3.org/2001/XMLSchema-instance\"
    xmlns:xsd=\"http://www.w3.org/2001/XMLSchema\">
    <SchemaGuid>AE9A41C4-8147-4b27-9690-7C05D67F7927</
    SchemaGuid>
    <AcquiringBankNumber>123456</AcquiringBankNumber>
    <Amount>10.9</Amount>
    <CashBackAmount>0</CashBackAmount>
    <SurchargeAmount>0</SurchargeAmount>
    <CurrencyType>123</CurrencyType>
    <EncryptedPin />
    <MerchantNumber>789012345678</MerchantNumber>
    <MsrTrackData1 />
    <MsrTrackData2>;xxxxxxxxxxxxxxxx=xxxxxxxxxxxxxxxx?</
    MsrTrackData2>
    <MsrTrackData3 />
    <MsrTrackData4 />
    <PinPadNumber>3456</PinPadNumber>
    <PosTransactionNumber>0002</PosTransactionNumber>
    <StandardIndustryClassification>7890</
    StandardIndustryClassification>
    <StoreNumber>9012</StoreNumber>
    <TerminalSerialNumber>00000001</TerminalSerialNumber>
    <TimeZone>900</TimeZone>
    <TransactionCode>20</TransactionCode>
    <ZipCode>45678</ZipCode>
    <PaymentMethodCode>Credit Card</PaymentMethodCode>
    <AdditionalSecurityInfo />
</AuthorizationDataStructure>
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
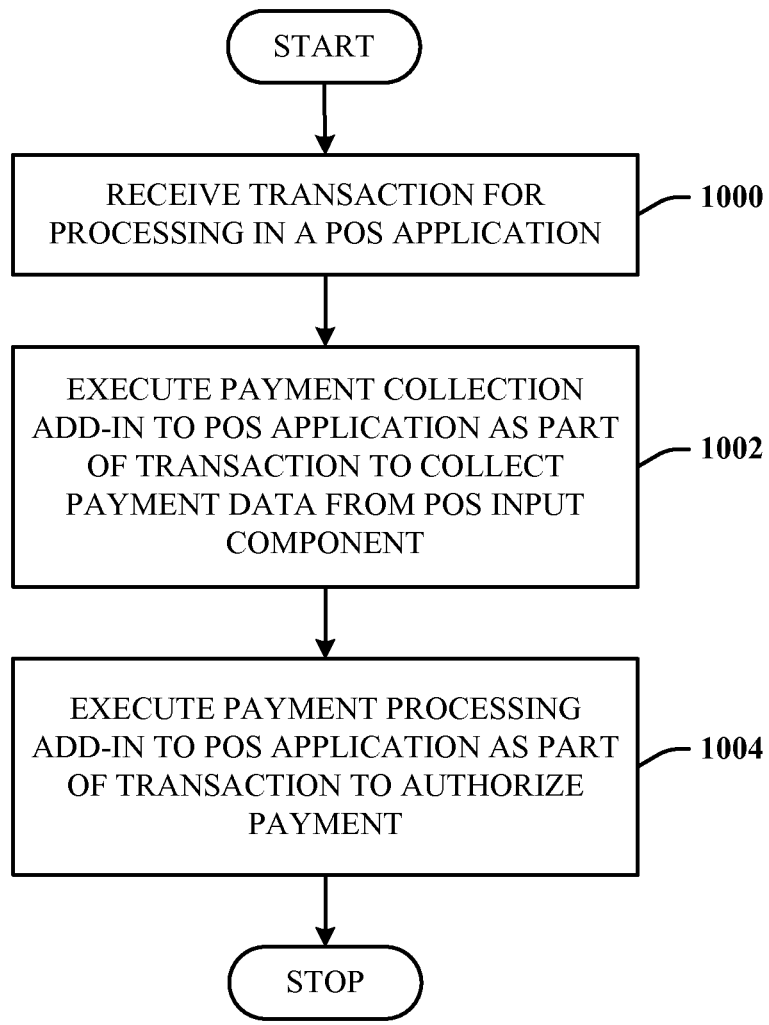
FIG. 10 illustrates a computer-implemented POS method in accordance with the disclosed POS extensibility architecture.

FIG. 10 illustrates a computer-implemented POS method in accordance with the disclosed extensibility architecture. At 1000, a transaction is received for processing in a POS application. At 1002, a payment collection add-in to the POS application is executed as part of the transaction to collect payment data from a POS input component. The POS input component can be a simple and/or complex hardware add-in such as an MSR, PIN pad, etc., or a UI that presents options to a user and receives user input. At 1004, a payment processing add-in to the POS application is executed as part of the transaction to authorize payment.

Figure 11:
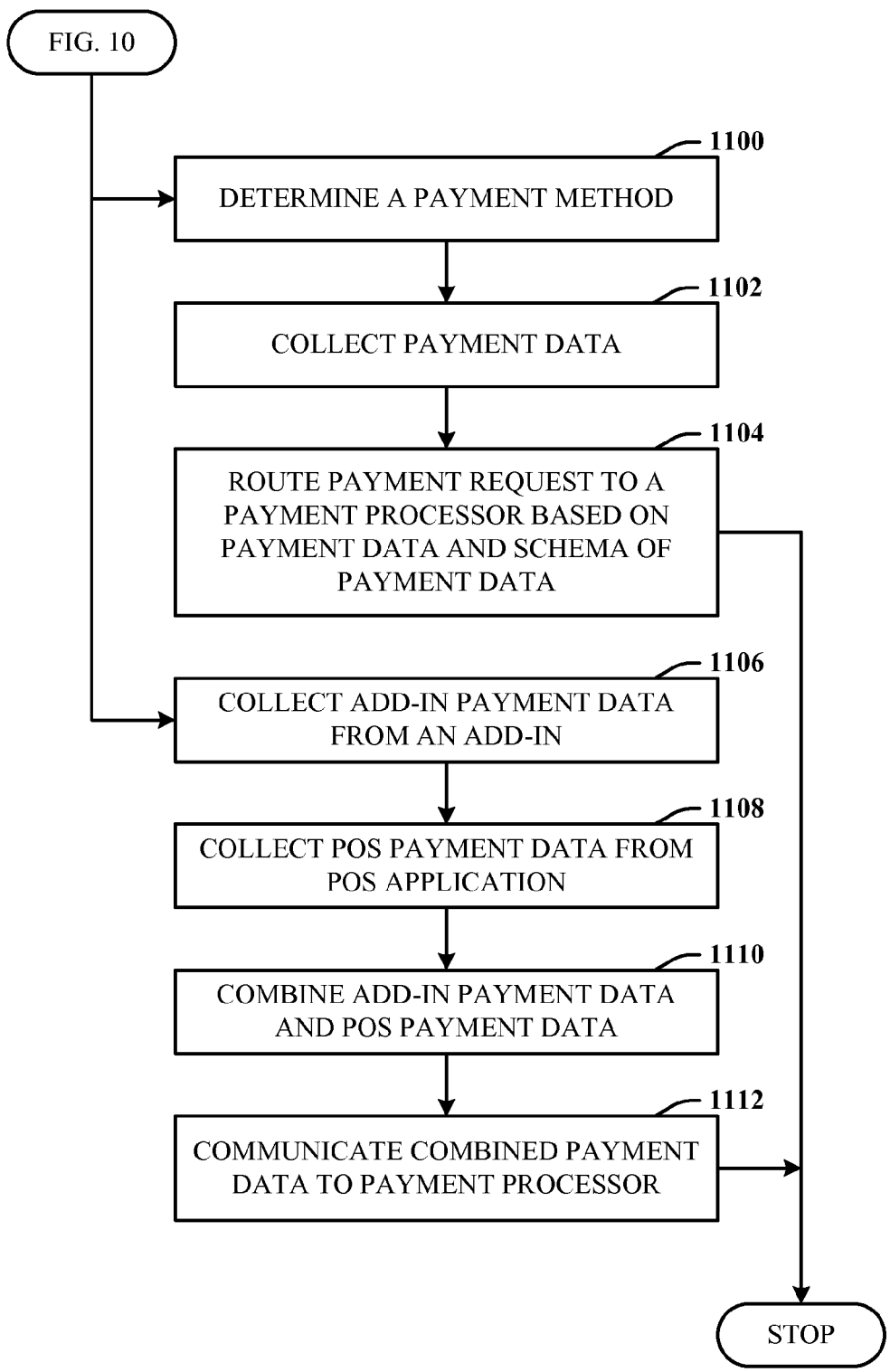
FIG. 11 illustrates additional aspects of the method of FIG. 10.

FIG. 11 illustrates additional aspects of the method of FIG. 10. At 1100, a payment method is determined. This can be by user selection via a POS hardware device such as a PIN pad. At 1102, the payment data is collected. At 1104, a payment request is routed to a payment processor based on the payment data and schema of the payment data. At 1106, add-in payment data is collected from an add-in. At 1108, POS payment data is collected from the POS application. At 1110, the add-in payment data and the POS payment data are combined. At 1112, the combined payment data (add-in payment data and POS payment data) are communicated to a payment processor.

Figure 12:
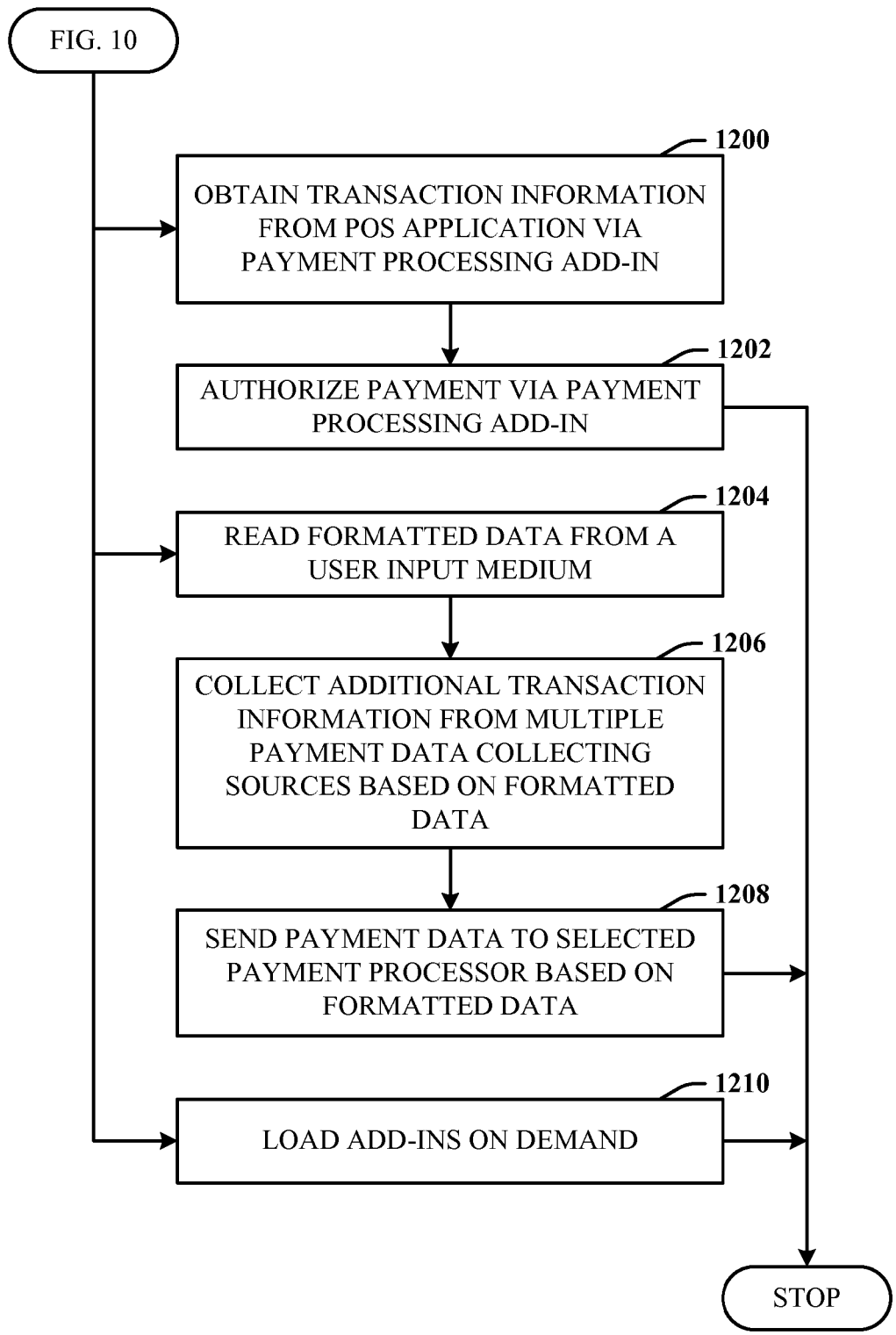
FIG. 12 illustrates additional aspects of the method of FIG. 10.

FIG. 12 illustrates additional aspects of the method of FIG. 10. At 1200, transaction information is obtained from the POS application via the payment processing add-in. At 1202, the payment is authorized via the payment processing add-in. At 1204, formatted data is read from a user input medium. At 1206, additional transaction information is collected from multiple payment data collecting sources based on the formatted data. At 1208, the payment data is sent to a selected payment processor based on the formatted data. At 1210, the add-ins are loaded on demand.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
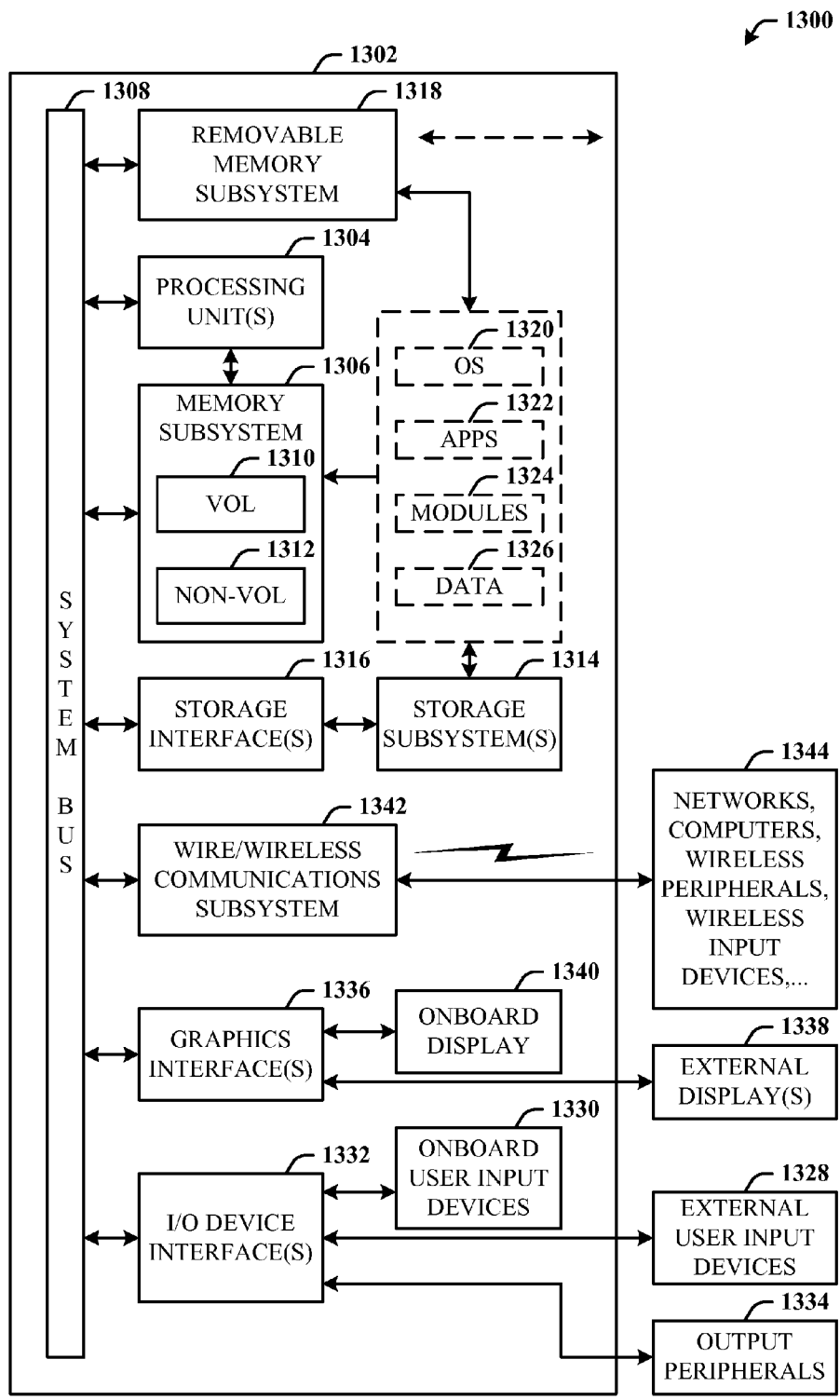
FIG. 13 illustrates a block diagram of a computing system operable to execute POS application extensibility in accordance with the disclosed architecture.

Referring now to FIG. 13, there is illustrated a block diagram of a computing system 1300 operable to execute POS application extensibility in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314 (e.g., optical, magnetic, solid state), including an operating system 1320, one or more application programs 1322, other program modules 1324, and program data 1326.

The one or more application programs 1322, other program modules 1324, and program data 1326 can include the modules, APIs, and components of the system 100 of FIG. 1, the modules, APIs, and components of the system 200 of FIG. 2, the API 400 of FIG. 4, the schema 500 of FIG. 5, the data flow 800 of FIG. 8, the hardware add-in UI 900 of FIG. 9, and the methods represented by the flow charts of FIGS. 3, 6-7, and 10-12, for example.

Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP-based) using logical connections via a wired/wireless communications subsystem 1342 to one or more networks and/or other computers. The other computers can include workstations, servers, routers, personal computers, microprocessor-based entertainment appliances, peer devices or other common network nodes, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
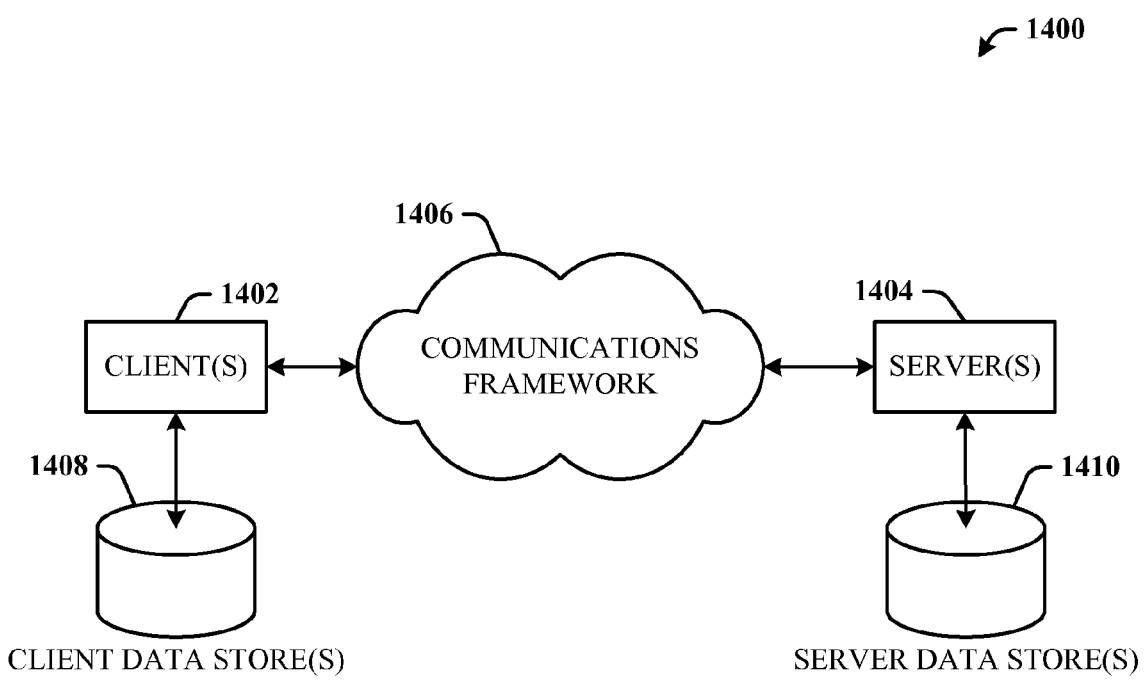
FIG. 14 illustrates a schematic block diagram of a computing environment that supports payment workflow extensibility.

Referring now to FIG. 14, there is illustrated a schematic block diagram of a computing environment 1400 that supports payment workflow extensibility. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An extensible computer-implemented point-of-sale (POS) system, comprising:
   a processing unit for executing computer-executable instructions; and
   memory storing computer-executable instructions for implementing:
      a POS application associated with a set of supported POS hardware devices configured to collect payment data for payment formats supported by the POA application, the POS application having built-in payment processing functionality for receiving payment data collected via the supported POS hardware devices and for communicating collected payment data based on payment format to one or more payment processors to obtain payment authorization;
      an add-in development component included in the POS application, the add-in development component exposing interfaces for add-in modules to extend the built-in payment processing functionality of the POS application; and
      a hardware add-in module that communicates with a customer input device not included in the set of supported POS hardware devices, the customer input device configured to collect payment data and operate a program that allows a customer to select from among a plurality of payment methods, wherein:
         the POS application is configured to send a payment amount to the customer input device via an interface for the hardware add-in module that is exposed by the add-in development component, and
         the hardware add-in module is configured to map a payment method selected via the customer input device to a payment format supported by the POS application and communicate payment data collected via the customer input device to the POS application.

2. The system of claim 1, wherein:
   the POS application generates POS data, and
   the POS data and the payment data communicated to the POS application by the hardware add-in module are combined and transmitted to a payment processor.

3. The system of claim 1, wherein the POS application routes the payment data received from the hardware add-in module to a specific payment processor based on the payment format of the payment data.

4. The system of claim 1, wherein the hardware add-in module registers with the POS application via the add-in development component.

5. The system of claim 1, wherein the POS application executes a payment processing module based on the payment format of the payment data received from the hardware add-in module.

6. The system of claim 1, wherein the POS application communicates the payment data received from the hardware add-in module to a payment processor when the payment data received by from hardware add-in module matches a predefined payment data schema defined by the add-in development component.

7. The system of claim 1, wherein:
   the add-in development component is a software development kit (SDK) that supports the definition of application programming interfaces for third-party add-in modules and defines required elements for third-party payment data schemas, and the customer input device includes card reader functionality, keypad functionality, and signature functionality integrated into the customer input device.

8. An extensible computer-implemented point-of-sale (POS) system, comprising:
a processing unit for executing computer-executable instructions; and
memory storing computer-executable instructions for implementing:
a POS application associated with a set of supported POS hardware devices configured to collect payment data for payment formats supported by the POA application, the POS application having built-in payment processing functionality for receiving payment data collected via the supported POS hardware devices and for communicating collected payment data based on payment format to one or more payment processors to obtain payment authorization;
an add-in development component included in the POS application, the add-in development component exposing interfaces for add-in modules to extend the built-in payment processing functionality of the POS application;
hardware add-in module that communicates with a customer input device not included in the set of supported POS hardware devices, the customer input device configured to collect payment data and operate a program that allows a customer to select a payment format not supported by the POS application, wherein:
the POS application is configured to send a payment amount to the customer input device via an interface for the hardware add-in module that is exposed by the add-in development component, and
the hardware add-in module is configured to communicate payment data collected via the customer input device to the POS application; and
a payment processing add-in module that communicates with the POS application via an interface for the payment processing add-in module that is exposed by the add-in development component, the payment processing add-in module configured to process authorization of the payment data for the payment format not supported by the POS application.

9. The system of claim 8, wherein:
the POS application generates POS data, and
the POS data and the payment data communicated to the POS application by the hardware add-in module are combined and transmitted to a payment processor.

10. The system of claim 8, wherein the POS application routes payment data for a payment format that is supported by the POS application and is selected via the customer input device to a specific payment processor based on the payment format of the payment data.

11. The system of claim 8, wherein the POS application executes the payment processing add-in module based on the payment format of the payment data received from the hardware add-in module.

12. The system of claim 8, wherein the POS application communicates the payment data received from the hardware add-in module to the payment processing add-in module when the payment data received from the hardware add-in module does not match any predefined payment data schema defined by the add-in development component.

13. The system of claim 8, wherein:
the add-in development component is a software development kit (SDK) that supports the definition of application programming interfaces for third-party add-in modules and defines required elements for third-party payment data schemas, and
the customer input device includes card reader functionality, keypad functionality, and signature functionality integrated into the customer input device.

14. A computer-implemented point-of-sale (POS) method, comprising:
executing, by a computer, a POS application associated with a set of supported POS hardware devices configured to collect payment data for payment formats supported by the POA application, the POS application having built-in payment processing functionality for receiving payment data collected via the supported POS hardware devices and for communicating collected payment data based on payment format to one or more payment processors to obtain payment authorization;
exposing, by an add-in development component included in the POS application, interfaces for add-in modules to extend the built-in payment processing functionality of the POS application;
executing, by the computer, a hardware add-in module that communicates with a customer input device not included in the set of supported POS hardware devices, the customer input device configured to collect payment and operate a program that allows a customer to select from among a plurality of payment formats, the plurality of payment formats including a payment format not supported by the POS application;
sending, by the POS application, a payment amount to the customer input device via an interface for the hardware add-in module that is exposed by the add-in development component; and
communicating, by the hardware add-in module, payment data collected via the customer input device to the POS application, wherein:
the POS application communicates the payment data received from the hardware add-in module to a payment processor when the payment data is for a payment format supported by the POS application, and
the POS application communicates the payment data received from the hardware add-in module to a payment processing add-in module, via an interface for the payment processing add-in module that is exposed by the add-in development component, to authorize payment when the payment data is for the payment format not supported by the POS application.

15. The method of claim 14, further comprising:
routing, by the POS application, the payment data received from the hardware add-in module to the payment processor or the payment processing add-in module based on a predefined payment data schema defined by the add-in development component.

16. The method of claim 14, further comprising:
combining, by the POS application, the payment data received from the hardware add-in module with POS data generated by the POS application into combined payment data; and
communicating, by the POS application, the combined payment data to the payment processor.

17. The method of claim 14, further comprising:
obtaining transaction information from the POS application by the payment processing add-in module; and
authorizing the payment by the payment processing add-in module.

18. The method of claim 14, further comprising;
loading, by the computer, one or more of the hardware add-in module and the payment processing add-in module on demand.

19. The method of claim 14, wherein:
the add-in development component is a software development kit (SDK) that supports the definition of application programming interfaces for third-party add-in modules and defines required elements for third-party payment data schemas, and
the customer input device includes card reader functionality, keypad functionality, and signature functionality integrated into the customer input device.

20. A computer-readable memory storing computer-executable instructions implementing the method of claim 14.

* * * * *